(12) United States Patent
Broglio et al.

(10) Patent No.: US 8,707,875 B2
(45) Date of Patent: Apr. 29, 2014

(54) GASIFICATION COMBUSTION SYSTEM

(75) Inventors: Ron Broglio, Vandiver, AL (US); Hanwei Zhang, Princeton, NC (US)

(73) Assignee: Covanta Energy Corporation, Morristown, NJ (US)

( * ) Notice: Subject to any disclaimer, the term of this patent is extended or adjusted under 35 U.S.C. 154(b) by 1087 days.

(21) Appl. No.: 12/467,887

(22) Filed: May 18, 2009

(65) Prior Publication Data
US 2010/0288171 A1 Nov. 18, 2010

(51) Int. Cl.
*F23G 5/027* (2006.01)
*F23B 10/02* (2011.01)

(52) U.S. Cl.
USPC .......................... 110/229; 110/296

(58) Field of Classification Search
USPC ............. 110/229, 230, 231, 225, 295, 296; 48/119, 120, 122, 123, 89, 101, 113
See application file for complete search history.

(56) References Cited

U.S. PATENT DOCUMENTS

| | | | | |
|---|---|---|---|---|
| 2,283,641 A | * | 5/1942 | Martin et al. | 110/225 |
| 2,491,435 A | | 12/1949 | Yellott | |
| 2,884,368 A | | 4/1959 | Sweeney | |
| 4,172,425 A | | 10/1979 | Sheridan | |
| 4,332,206 A | | 6/1982 | Tucker et al. | |
| 4,417,528 A | * | 11/1983 | Vining et al. | 110/229 |
| 4,481,890 A | * | 11/1984 | Lewis | 110/225 |
| 4,597,771 A | | 7/1986 | Cheng | |
| 4,597,777 A | | 7/1986 | Graham | |
| 4,679,268 A | * | 7/1987 | Gurries et al. | 110/346 |
| 4,715,810 A | | 12/1987 | Ramsey et al. | |
| 4,751,054 A | | 6/1988 | Watanabe | |
| 4,765,256 A | * | 8/1988 | Caughey | 110/229 |
| 4,784,603 A | | 11/1988 | Robak, Jr. et al. | |
| 5,005,493 A | | 4/1991 | Gitman | |
| 5,027,751 A | * | 7/1991 | Archer et al. | 122/449 |
| 5,038,690 A | | 8/1991 | Kumagai et al. | |
| 5,505,145 A | | 4/1996 | Gross et al. | |
| 5,711,235 A | | 1/1998 | May et al. | |
| 6,063,350 A | | 5/2000 | Tarabulski et al. | |
| 6,067,916 A | * | 5/2000 | Martin et al. | 110/348 |
| 6,148,599 A | | 11/2000 | McIntosh et al. | |
| 6,199,492 B1 | * | 3/2001 | Kunstler | 110/342 |
| 6,227,847 B1 | * | 5/2001 | Gillespie | 110/236 |
| 6,250,236 B1 | | 6/2001 | Feizollahi | |

(Continued)

FOREIGN PATENT DOCUMENTS

FR 2458752 A1 1/1981
JP 2004077013 A 3/2004

(Continued)

OTHER PUBLICATIONS

International Search Report dated Mar. 24, 2010 corresponding to International Application No. PCT/US2009/050694.

(Continued)

*Primary Examiner* — Kenneth Rinehart
*Assistant Examiner* — David J Laux
(74) *Attorney, Agent, or Firm* — Hogan Lovells US LLP (57) ABSTRACT

A two stage refuse gasification combustion system for processing refuse is disclosed. The system may contain features such as an advancer, a first and second gasifier, a gas regulator, and a post combustor. Additionally, methods for regulating gas and advancing refuse through a two stage refuse gasification combustion system are disclosed.

24 Claims, 4 Drawing Sheets

(56) References Cited

U.S. PATENT DOCUMENTS

| | | | |
|---|---|---|---|
| 6,415,602 | B1 | 7/2002 | Patchett et al. |
| 6,485,296 | B1 * | 11/2002 | Bender et al. ............... 110/203 |
| 6,581,374 | B2 | 6/2003 | Patchett et al. |
| 7,070,693 | B2 | 7/2006 | Kelly |
| 7,150,145 | B2 | 12/2006 | Patchett et al. |
| 7,338,602 | B1 | 3/2008 | Parjus et al. |
| 7,384,562 | B2 | 6/2008 | Rogers |
| 7,947,095 | B2 | 5/2011 | Palonen et al. |
| 8,038,744 | B2 | 10/2011 | Clark |
| 8,038,746 | B2 | 10/2011 | Clark |
| 2001/0015160 | A1 | 8/2001 | Brunnmair et al. |
| 2006/0052902 | A1 | 3/2006 | Lefebvre et al. |
| 2007/0012230 | A1 | 1/2007 | Hashimoto et al. |
| 2007/0199485 | A1 | 8/2007 | Capote et al. |
| 2007/0225864 | A1 | 9/2007 | Bardi et al. |
| 2008/0250831 | A1 | 10/2008 | Rogers |
| 2009/0020456 | A1 | 1/2009 | Tsangaris et al. |
| 2010/0077942 | A1 | 4/2010 | D'Agostini et al. |
| 2012/0036777 | A1 | 2/2012 | Patel |

FOREIGN PATENT DOCUMENTS

| | | |
|---|---|---|
| JP | 2006023030 A | 1/2006 |
| WO | 8102582 A1 | 9/1981 |
| WO | 8103216 A1 | 11/1981 |
| WO | 0221047 A1 | 3/2002 |
| WO | 2008149145 A2 | 12/2008 |
| WO | 2010067223 A1 | 6/2010 |
| WO | 2010083519 A1 | 7/2010 |

OTHER PUBLICATIONS

International Search Report of International Application No. PCT/US0725834.

Doug Orr and David Maxwell, A Comparison of Gasification and Incineration of Hazardous Wastes, Mar. 30, 2000, Radian International LLC, Austin, TX.

Matti Nieminen, Waste Gasification vs. Incineration, Overview of Developments . . . Assessment of Technologies, VIT Business from Technology, Jan. 2, 2008, pp. 1-63.

Richard Mullen, Boise Cascade Pursues Low-Risk Path to Reap Gasification Benefits, Energy Daily Newsletter, Apr. 3, 2002.

Yao Bin Yang, Vida N. Sharifi, Jim Swithenbank, Converting moving-grate incineration from combustion to gasification—Numerical simulation of the burning characteristics, Sheffield University Waste Incineration Centre (SUWIC), Department of Chemical and Process Engineering, Sheffield University, Sheffield, UK, Mar. 7, 2006, pp. 645-655.

A. Porteous, Why energy from waste incineration is an essential component of environmentally responsible waste management, Department of Environmental and Mechanical Engineering, The Open University, UK, Feb. 14, 2005, pp. 451-459.

Kenichiro Inoue, Kenji Yasuda and Katsuya Kawamoto, Report: Atmospheric pollutants discharged from municipal solid waste incineration and gasification-melting facilities in Japan, Waste Management & Research, http://wmr.sagepub.com, May 26, 2009, pp. 617-622.

Japan's Ebara to Build Test Furnace for Gasifying Refuse, Asia Pulse, Jan. 16, 2004, pp. 1-2.

Jim Elbert, Texen Announces Contract to Purchase Texas Gasification Plant, www.texenoilandgas.com, Business Wire, Scottsdale, AZ, Jun. 15, 2005, pp. 1-2.

David Alexander and Jeffrey Bruhjell, Genoray Advanced Technologies Ltd. Announces Investment in Gasification Technology, PR Newswire, Mar. 29, 2004, pp. 1-3.

Waste foam?—burn it: incineration & energy recovery the best route for flexible foam, EHS report, Urethanes Technology, The Gale Group, vol. 23; Issue 3, Jun. 2006, pp. 1-3.

Lori Aizer Bryenton, Nexterra selected by the City of Stamford Connecticut to develop biomass gasification system for municipal wastewater treatment facility, PR Newswire, Sep. 10, 2009, pp. 1-3.

Nev. firm's system gasifies tires, sludge, Crain Communications, Inc., Waste News 14, Section: Products, Jun. 24, 2002, pp. 1-3.

Matti Nieminen, Marjut Suomalainen and Tuula Makinen, Gasification of shredder residue, VTT Research Notes 2344, Biologinkuja, Finland, May 2006.

International Search Report, mailed Apr. 3, 2011, International Application No. PCT/US2010/035259.

Ishikawajinna-Harima Heavy Industries Co., Ltd., Japanese Article, "Predicition of Heat Transfer and Flow Characteristics in Waste Incinerators," ISSN: 0578,7904, vol. 44, No. 6, Nov. 2004, pp. 361-367.

* cited by examiner

GASIFICATION COMBUSTION SYSTEM

FIELD OF THE INVENTION

The present invention relates to gasification or combustion systems generally. More specifically, the present invention relates to a method and system for regulating the flow of gas and refuse through a gasifier or combustor system.

BACKGROUND

Municipal solid waste ("MSW") is the gross product collected and processed by municipalities and governments. MSW includes durable and non-durable goods, containers and packaging, food and yard wastes, as well as miscellaneous inorganic wastes from residential, commercial, and industrial sources. Examples include newsprint, appliances, clothing, scrap food, containers and packaging, disposable diapers, plastics of all sort including disposable tableware and foamed packaging materials, rubber and wood products, potting soil, yard trimmings and consumer electronics, as part of an open-ended list of disposable or throw-away products. A traditional method of waste disposal is a landfill, which is still a common practice in some areas. Many local authorities, however, have found it difficult to establish new landfills. In those areas, the solid waste must be transported for disposal, making it more expensive.

As an alternative to landfills, a substantial amount of MSW may be disposed of by combustion at a municipal solid waste combustor ("MWC") to help recover energy from the waste. The conversion of waste to energy is often performed at a waste-to-energy plant ("WTE"). One of the problems associated with the conventional combustion of MSW and other solid fuels is that it creates small amounts of undesirable and potentially harmful byproducts, such as NOx, carbon monoxide, and dioxins. For example, NOx is formed during combustion through two primary mechanisms. First, fuel NOx is formed by the oxidation of organically bound nitrogen (N) found in MSW and other fuels. When the amount of O2 in the combustion chamber is low, N2 is the predominant reaction product. However, when a substantial amount of O2 is available, an increased portion of the fuel-bound N is converted to NOx. Second, thermal NOx is formed by the oxidation of atmospheric N2 at high temperatures. Because of the high activation energy required, thermal NOx formation does not become significant until flame temperatures reach 1,100° C. (2,000° F.).

Despite the improvements made in reducing the harmful emissions of conventional combustion systems, there is still a need for alternative methods and systems that efficiently convert MSW or other solid fuels to energy while producing a minimal amount of undesirable emissions.

SUMMARY OF THE INVENTION

The present invention relates to a gasification combustion system and method which controls the rate of gasification or combustion. By controlling the oxidant supply and temperature of gasification or combustion, the system can more efficiently burn refuse and reduce the emission of harmful products (gases and/or solids) into the atmosphere. Additionally, by controlling the rate and temperature of gasification or combustion, a more durable system can be created which will be more efficient in terms of energy conversion and flue gas processing after MSW thermal treatment.

Embodiments of the present invention may employ a moving grate that enables the movement of waste through the combustion chamber and thus allows complete combustion of the waste. Additionally, a primary air source and a secondary air source may be utilized. Primary air may be supplied from under the grate and forced through the grate to sequentially dry (evolve water), de-volatilize (evolve volatile hydrocarbons), and burn out (oxidize nonvolatile hydrocarbons) along the waste bed. The quantity of primary air may be adjusted to maximize burn out of the carbonaceous materials in the waste bed, while minimizing the excess air. Secondary air may be supplied through nozzles located above the grate and used to create turbulent mixing that destroys the hydrocarbons that evolved from the waste bed. The total amount of air (primary and secondary) used in the system may vary from approximately 30% to 100% more than the amount of air required to achieve stoichiometric conditions (i.e., the minimum amount of air to theoretically completely combust the fuel).

The invention may utilize different technologies for reducing the harmful emissions created by conventional MSW combustion systems. For example, combustion controls and post-combustion controls may be used. Combustion controls limit the formation of NOx during the combustion process by reducing the availability of $O_2$ within the flame and by lowering combustion zone temperatures; whereas post-combustion controls involve the removal of the NOx emissions produced during the combustion process (e.g., selective non-catalytic reduction (SNCR) systems and selective catalytic reduction (SCR) systems).

In one embodiment of the present invention, a two stage refuse gasification combustion system for processing refuse is disclosed. The system may comprise an advancer, a first and second gasifier, a first gas regulator, and a post combustor. The post combustor may contain a connection to the first and second gasifier, and an ash collector designed to receive fly ash and heavy weight particles. The ash collector may contain a connection to the second gasifier for directing the fly ash and heavy weight particles into the second gasifier. The first gas regulator may contain an input port for receiving gas, an output port for outputting gas, valves for regulating gas flow, and control software to allow the regulator to control opening and closing of the valves which regulate how much gas flows into the input port and how much gas flows out of the output port.

The system described above may also contain the following additional features. The system may comprise an input having an opening formed by an outer housing for receiving said refuse. The system may comprise a first gas hopper fluidly connected to a first gas splitter and the first gasifier. The first gas splitter may be connectable to a gas source for receiving gas external from the system. Also the first and second gasifier may comprise a sloped top for directing gas into the post combustor. The system may comprise a second gas hopper fluidly connected to a second gas splitter and the second gasifier. The second gas splitter may be connectable to a gas source for receiving gas external from the system. The ash collector of the post combustor may comprise a conical or cyclone shape. The first regulator may comprise: a gas source containing compressed gas or a gas movement device; a sensor for determining gas temperature in the post combustor or ports leading into the post combustor; and an adjuster for adjusting the amount of gas flowing into the post combustor. The adjuster may also allow the regulator to adjust the angle in which ports expel gas into the post combustor. The system may also comprise a flue connected to the post combustor. The flue may comprise a valve operable to allow gas to escape the system when the valve is in a first position or cause gas to recirculate in a second position. The system may also comprise a second gas regulator for directing gas through the system. The second gas regulator may contain a connection with the flue to receive recirculated gas from the flue and a valve controller to control the position of the flue valve. The second gas regulator may also comprise a connection to the gas source to allow the second gas regulator to receive gas external from the system; a gas output connected to the first gas regulator to direct gas into the first gas regulator; and a valve and valve controller to control how much gas from the flue and the gas source flows through the gas output. The first gas regulator may comprise an input for receiving gas from the second gasifier and an input for receiving gas from the second gas regulator, and at least three output ports for directing gas into the post combustor The first output port may be connected to a lower portion of a sidewall of the post combustor for directing gas horizontally in the post combustor. The second output port may be connected to an upper portion of the sidewall of the post combustor for directing gas horizontally in the post combustor. The third output port may be connected to a top portion of the post combustor for directing gas downwardly into the post combustor. The first gas regulator may contain an adjuster for manipulating the angle at which the three output ports direct gas into the post combustor.

The system can comprise a central controller which may contain software stored on computer readable media (such as RAM or optical media), and a microprocessor for allowing the controller to regulate the flow of oxygen containing streams throughout the system. For example, the software may cause the controller to increase the speed of the advancer; controlling the flow rate of gas through a first and second gas splitter; and controlling the positioning of the valves in the first gas regulator. The software may also allow the controller to control various functions of certain system components such as gas splitters, flue gas splitter, the first and second gas regulators, gasifiers, and the advancer. In some embodiments these components may also comprise microprocessors, memory, and their own instruction sets as well. The software of the controller (or the regulators or both) may contain one or more set of instructions for regulating and controlling the amount of oxygen in the ports entering the various components of the system (such as the first gasifier, the second gasifier, and the post combustor) thereby controlling the temperature and speed of the gasification and combustion of the refuse and gases, allowing the system to reduce the production $NO_x$ or other undesirable byproducts, while also completing the gasification and combustion of the organic content of the refuse before it enters the bottom ash collector. For example, a first instruction of this instruction set may cause the controller to instruct gas splitter to send gas having a low oxygen content (such as 5%-20% $O_2$ by weight, preferably 5%-10%) to the first gasifier through gas splitter. To do this, controller (or gas splitter) may instruct regulator to send recirculated gas through port. To obtain the recirculated gas, the regulator (or controller) may cause the valve in the flue to partially open allowing flue gas to enter port. A second instruction of this instruction set may cause the controller to instruct gas splitter to send oxygen rich gas (such as 20-100% $O_2$ by weight) to the second gasifier through the second gas splitter. To do this, controller (or gas splitter) may instruct gas source to direct gas into gas splitter (or gas splitter may open a valve allowing gas from gas source to enter gas splitter for example). Controller (or gas splitter) may also shut a valve connected to port to prevent the flow of recirculated gas from regulator (or the regulator may shut an appropriate valve in the flue for example.) A third instruction of this instruction set may cause the controller to instruct regulator to monitor the temperature of the gases in the post combustor (regulator may also monitor the oxygen content of the gases in the post combustor. Alternatively, controller may be equipped with a sensor and may perform the monitoring directly.) If the temperature of the gases in the post combustor becomes higher than a predetermined value (such as 1000 C) (or the oxygen content of the post combustor gases becomes higher than a predetermined value, such as 10% by volume regulator may request regulator to send recirculated (low oxygen content) gas to the post combustor. If the temperature becomes lower than a predetermined value (such as 800 C) (or the oxygen content of the post combustor gases becomes lower than a predetermined value, such as 1% by volume, controller may request oxygen rich gas from a gas source be routed through the port through the regulators into the post combustor. (Alternatively if the regulators comprise their own gas source, the regulator may use this gas source to provide the oxygen rich gas.) Additionally, the controller may also monitor the temperature or oxygen content of the gas in various locations of the post combustor. If a certain section of the post combustor has gas at too high or too low of a temperature (or too high or too low of a percentage of oxygen), regulator may direct gas through a particular port to adjust the temperature (or oxygen content) of gas in that section of the post combustor. In some embodiments, regulator may also be able to adjust the angle at which the ports make with the post combustor to increase the regulator's ability to control the temperature (or oxygen content) of gases in the post combustor. Also, the central controller may be able to control the rate of advancement of the refuse through the refuse advancer.

In addition to above embodiments and its variants, a method for regulating gas and advancing refuse through a two stage refuse gasification combustion system is disclosed. The method may comprise the steps of: advancing the refuse into a first gasifier; processing the refuse at the first gasifier to generate volatiles in the first gasifier by directing the gas through the refuse; directing the gas and volatiles into a post combustor; combusting the gas and volatiles mixture in the post combustor; advancing the refuse into a second gasifier; processing the refuse in the second gasifier; directing gas from the second gasifier to a first gas regulator; and receiving gas from the first gas regulator and combusting the gas thereby producing heat and combustor gas.

The above method may comprise additional steps or some of the steps may have additional features. For example, the above method may comprise the step of receiving refuse at an input; advancing the refuse from the input to the first gasifier using an advancer; receiving gas at a first gas splitter; directing the gas from the first gas splitter through a first gas hopper to the first gasifier; receiving gas at a second gas splitter; and directing the gas from the second gas splitter through a second gas hopper to the second gasifier. The method may also comprise the step of collecting residual fly ash and particles with an ash collector and directing the residual fly ash and particles into the second gasifier. Also, the step of processing the refuse at the second gasifier may transform the refuse into bottom ash, heat, and gas. The method may incorporate advancing the bottom ash along the advancer into a bottom ash collector and directing the heat and gas into a first gas regulator. In an additional configuration, the method may require the steps of receiving gas at a first gas regulator from the second gasifier; receiving gas at the first gas regulator from a second gas regulator; and controlling the receipt of gas from the second gasifier and second gas regulator by adjusting one more internal valves. Also the method may entail: directing the combustor gas into a flue; controlling a valve controller to direct a valve to allow the combustor gas to escape the system or recirculate the gas back into the system; receiving gas from the flue and gas from the gas source at a second gas regulator; manipulating a valve to control how much gas from the flue and from the gas source flow through an output port; or directing gas into the first gas regulator by opening a valve in the output port of the second gas regulator.

DETAILED DESCRIPTION

Figure 1:
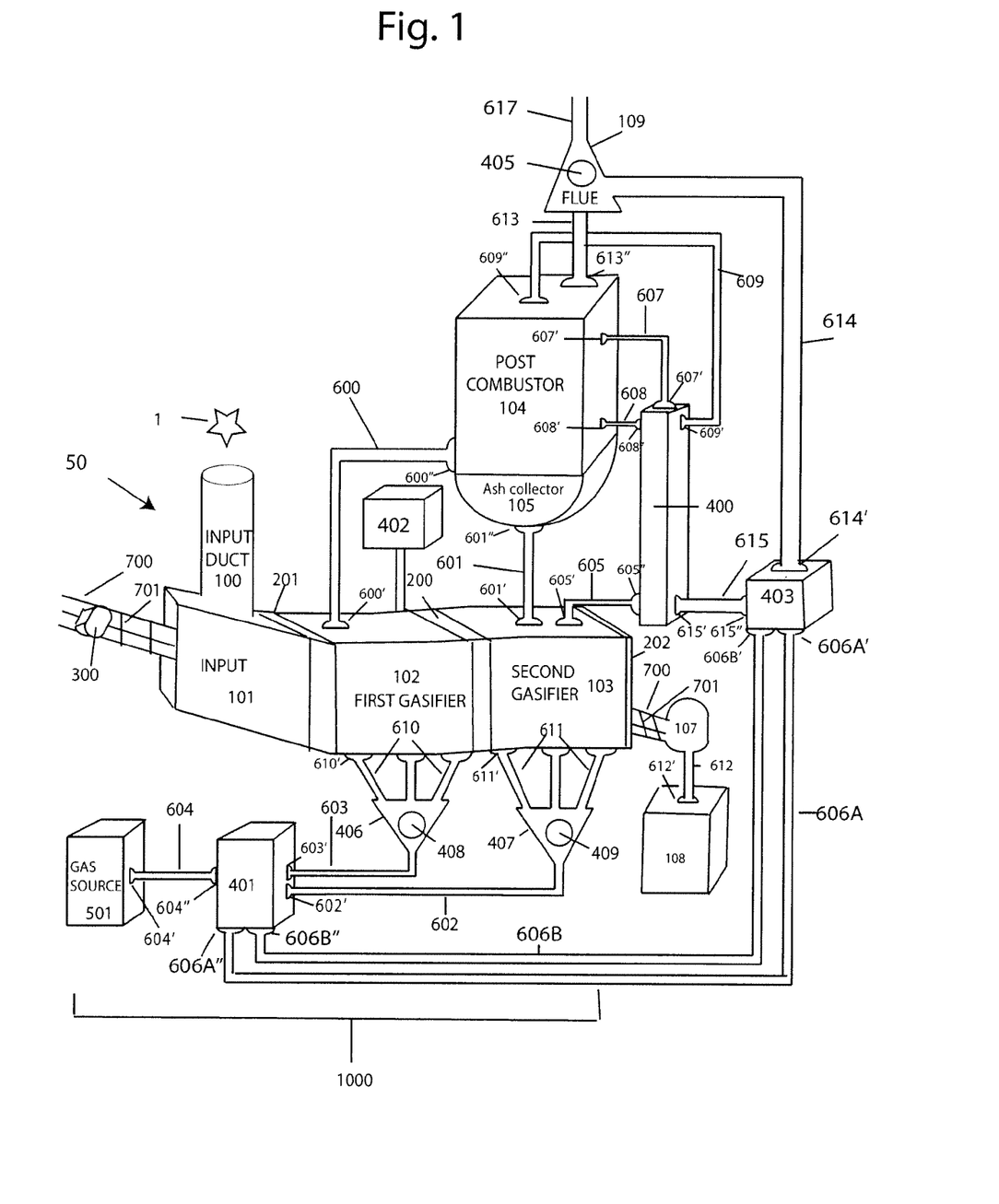
FIG. 1 is a forward view of an embodiment of the present invention wherein the gasifiers contain door ports.

FIG. 1 illustrates an embodiment of the present invention. The combustion gasification system (broadly denoted as element 50) comprises an input 101 for receiving refuse 1, a first gasifier 102, a second gasifier 103, and a post combustor 104. Refuse 1, trash, or waste may be placed into the input 101 through an input duct 100 containing an outer housing. The input 101 may comprise an opening formed by an outer housing for receiving the refuse. Processing of the refuse 1 typically begins in the first gasifier 102. Processing may include one or more of the following functions: drying, devolatilizing, gasification, or combustion. In some embodiments oil or other flammable substances may be added to the refuse 1 to facilitate combustion.

Once inside the input 100, the refuse 1 may be advanced through the system 50 by a refuse advancer 700. The refuse advancer 700 may take form of a hydraulic ram 300 and grate 701 as shown in FIG. 1, or a self advancing advancer may be used. In other embodiments the advancer 700 can take the form of a cork screw advancer or a stoker for example. Additionally, gravity or magnetism for example may be used to advance the refuse 1. The refuse advancer 700 may extend through the first gasifier 102, the second gasifier 103, and into the bottom ash collector 107. The refuse advancer 700 may be positioned in a downward angle to facilitate the movement of the refuse forward through the first 102 and second gasifiers 103 where the refuse will be processed. In preferred embodiments, the refuse 1 will be completely or nearly completely processed by the time the refuse 1 reaches the bottom ash collector 107.

There are a number of ports, pipes, or ducts extending to and from the gasifiers. These ports (600-615) transport various gases and particles throughout the system 50. In some embodiments connectors (600'-615' and 600"-615") may be used to connect the ports 600-615 to various components of the system (such as the first gasifier 102 or the post combustor 104).

The first gasifier 102 has a first gasifier gas port 600 and gas connector 600' and gas hoppers 610 and gas hopper connectors 610'. In some embodiments, each gasifier may contain as little as 1 gas hopper or as many as 10 or more gas hoppers with 3 or 4 gas hoppers being preferred. The gas port 600 is designed to receive volatile gases which are released when the refuse 1 is gasified. Molecules such as diatomic nitrogen, methane, diatomic hydrogen, carbon dioxide, carbon monoxide, water vapor, various other metallic and non metallic compounds may be released depending on the composition of the refuse 1. The gas in port 600 is commonly called synthetic gas "syngas", since it is a gas comprising carbon monoxide and hydrogen which is produced during the gasification of the refuse.

The gas hoppers 610 provide gas from the gas source 501 to the first gasifier 102 to control the gasification or burn rate of the refuse 1. In some embodiments this gas may take the form of atmospheric air, but other gas such as $O_2$, $CO_2$, and water vapor may be used alone or in combination with each other or other gases. The valves 408 and 409 can regulate how much gas goes into each hopper 610 and 611. Gas splitters 406 and 407 receive the gas from gas ports 603 and 602. Regulator 401, in some embodiments, can regulate the temperature, composition, and humidity of the gas. Additionally gas splitter 401 may regulate the flow rate of the gas through the gas ports 602 and 603. Gas source 501 may contain pressurized gas or may be a gas delivery machine such as fan for example. Gas source 501 may receive the gas from an unshown supply, or may circulate atmospheric gas into the gas port 604. One or more of the regulators (403 & 400) may contain an air input which allows the regulators to insert gas from a gas supply or atmospheric gas to be entered into the system 50. The entire gas source assembly is broadly denoted as element 1000.

Figure 3:
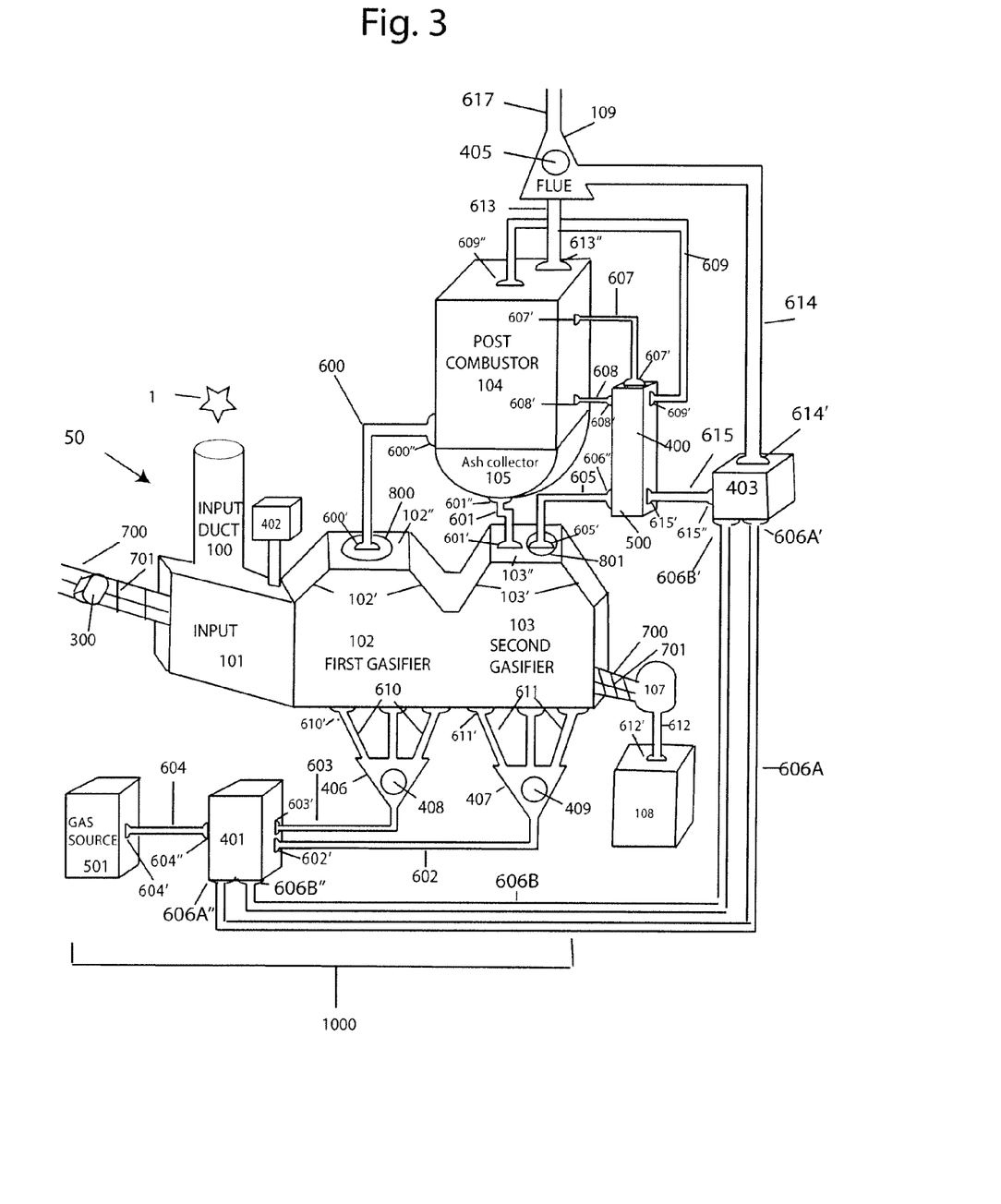
FIG. 3 is a forward view of an embodiment of the present invention wherein the gasifiers contain venting hood fans and no door ports.

In the embodiment of FIG. 1, when the refuse reaches the end of the first gasifier 102, the first gasifier door port 200 will open, allowing the refuse to exit the first gasifier 102 and enter the second gasifier 103. As shown, the second gasifier also is connected to a series of gas hoppers 611 and gas hopper connectors 611'. Additionally the second gasifier is connected to an ash port 601 and second gasifier gas port 605. Ash from the post combustor 104 may enter the second gasifier through the ash port 601 which contains connectors 601" and 601'. Oxygen-containing gas may leave the second gasifier through the second gasifier gas port 605 which may be attached to the second gasifier 103 via gas port 605'. After a period of time, the refuse 1 will exit the gasifier through the second gasifier door port 202 where the refuse will be transported to the bottom ash collector 107. FIG. 3 shows an alternative embodiment of the system 50, wherein the gasifiers do not contain door ports 200 and 202. In order to help direct the gas upward into the post combustor, the gasifiers may utilize sloped top portions 102' and 103' which may function in conjunction with optional venting hood fans 800 and 801. (The first and second gasifier may also comprise faces such as a sidewall, frontwall, backwall, and a bottom portion.) The top of the gasifiers may be partially sloped so that a top portion 102" and 103" is formed, or the sloped top portions 102' and 103' may connect directly (not shown). The venting hood fans 800 and 801 may suck gas from the gasifiers 102 and 103 and direct the gas into ports 600 and 605. Although not shown in FIG. 1, the embodiment shown in FIG. 1 may be optionally constructed with venting hood fans to assist in transferring the gas from the gasifiers into the post combustor 104.

Returning to FIG. 1, the bottom ash collector 107 is responsible for collecting any materials which are still on the advancer 700. These materials may include any materials which did not gasify or combust in the first and second gasifiers. The bottom ash collector 107 may contain a repository 108 which stores the collected materials. In some embodiments the repository 108 may be integral with the bottom ash collector 107 or in other embodiments as shown, the repository 108 may be a separate part connected by way of an ash collector port 612 and connector 612'.

The post combustor 104 may receive volatiles and syngas from the first gasifier 102 through the first gasifier port 600. The post combustor 104 may mix these volatiles with oxygen-containing gas from the upper port 609 and side ports 607 and 608. The gas entering the post combustor 104 from the first gasifier 102 may be at a very high temperature which may increase the formation of nitrous oxide "NOx" when combusted. By controlling mixing of various gases in the post combustor, the first gas regulator 400 can lower the temperature of the combustion thereby creating less NOx. Lowering the production of NOx is desirable since NOx is highly toxic and can potentially damage human health. Gas regulator 400 can regulate how much gas flows into ports 608, 609, and 607 and how much gas flows from ports 605 and 615, by controlling various internal valves. Structurally, the post combustor 104 may comprise a substantially rectangular shape such as a rectangular prism or may comprise a more cylindrical shape. The post combustor may comprise six or more faces: such as a sidewall, a frontwall, a backwall, a bottom portion and a top portion. One or more output ports of the first gas regulator may attach to one of these faces. In the embodiment shown in FIG. 3, output port 608 attaches to a lower portion of the sidewall of the combustor 104, output port 607 attaches to an upper portion of the sidewall of the combustor 104, and output port 609 attaches to a top portion of the post combustor 104.

Gas regulators 400 and 403 may comprise a microprocessor and control software which enables the regulators to control the opening and closing of internal valves. In some embodiments, the regulator may be able to partially open and close the valves. Gas regulators 400 and 403 may comprise a gas source similar to gas source 501, which may include compressed gas or a gas movement device such as a fan. This gas source may be a source of air, water vapor, $O_2$, $CO_2$, $N_2$, and other gases. Regulators 400 and 403 may have a sensor which can determine the temperature of gas in the post combustor 104, ports 605, 615, and 600. Regulator 400 may contain an adjuster for adjusting the amount of gas flowing into the post combustor 104, and may be able to adjust the angle in which ports expel gas into the post combustor. For example, any of the ports may be equipped with an adjustable nozzle which can affect the direction of the gas flow.

Central controller 402 may contain software stored on computer readable media (such as RAM or optical media), and a microprocessor for allowing the controller to regulate the flow of oxygen containing streams throughout the system. The software may allow the controller 402 to control various functions of certain system components such as gas splitters 401, 406 and 407, flue gas splitter 405, the first and second gas regulators 400 and 403, gasifiers 102 and 103, and the advancer 700. In some embodiments these components may also comprise microprocessors, memory, and their own instruction sets as well. The software of the controller (or the regulators or both) may contain one or more set of instructions for regulating and controlling the amount of oxygen in the ports entering the various components of the system (such as the first gasifier 102, the second gasifier 103, and the post combustor 104) thereby controlling the temperature and speed of the gasification and combustion of the refuse and gases, allowing the system to reduce the production $NO_x$ or other undesirable byproducts, while also completing the gasification and combustion of the organic content of the refuse before it enters the bottom ash collector 107. For example, a first instruction of this instruction set may cause the controller 402 to instruct gas splitter 401 to send gas having a low oxygen content (such as 5%-20% $O_2$ by weight, preferably 5%-10%) to the first gasifier through gas splitter 406. To do this, controller 402 (or gas splitter 401) may instruct regulator 403 to send recirculated gas through port 606A. To obtain the recirculated gas, the regulator 403 (or controller 402) may cause the valve 405 in the flue 109 to partially open allowing flue gas to enter port 614. A second instruction of this instruction set may cause the controller 402 to instruct gas splitter 401 to send oxygen rich gas (such as 20-100% $O_2$ by weight) to the second gasifier 103 through the second gas splitter 407. To do this, controller 402 (or gas splitter 401) may instruct gas source 501 to direct gas into gas splitter 401 (or gas splitter 401 may open a valve allowing gas from gas source 501 to enter gas splitter 401 for example). Controller 402 (or gas splitter 401) may also shut a valve connected to port 606A to prevent the flow of recirculated gas from regulator 403 (or regulator 403 may shut an appropriate valve in the flue 109 for example.) A third instruction of this instruction set may cause the controller 402 to instruct regulator 400 to monitor the temperature of the gases in the post combustor 104 (regulator 400 may also monitor the oxygen content of the gases in the post combustor 104. Alternatively, controller 402 may be equipped with a sensor and may perform the monitoring directly.) If the temperature of the gases in the post combustor 104 becomes higher than a predetermined value (such as 1000 C) (or the oxygen content of the post combustor gases becomes higher than a predetermined value, such as 10% by volume regulator 400 may request regulator 403 to send recirculated (low oxygen content) gas to the post combustor 104. If the temperature becomes lower than a predetermined value (such as 800 C) (or the oxygen content of the post combustor gases becomes lower than a predetermined value, such as 1% by volume, controller 402 may request oxygen rich gas from gas source 501 be routed through the port 606A through the regulators 403 and 400 into the post combustor. (Alternatively if regulators 400 or 403 comprise their own gas source, the regulator may use this gas source to provide the oxygen rich gas.) Additionally, controller 402 may also monitor the temperature or oxygen content of the gas in various locations of the post combustor 104. If a certain section of the post combustor 104 has gas at too high or too low of a temperature (or too high or too low of a percentage of oxygen), regulator 400 may direct gas through a particular port 607, 608, or 609 to adjust the temperature (or oxygen content) of gas in that section of the post combustor. In some embodiments, regulator 400 may also be able to adjust the angle at which ports 607, 608, and 609 make with the post combustor 104 to increase the regulator's ability to control the temperature (or oxygen content) of gases in the post combustor. Also, the central controller 402 may be able to control the rate of advancement of the refuse 1 through the refuse advancer 700.

In some embodiments, an ash collector 105 may be attached to the bottom of the post combustor 104. The ash collector 105 may be used to collect fly ash or heavy weight particles that are created during gasification or combustion. The ash collector 105 may be aided by the downward flow of air from the top gas port 609. The downward air flow may cause the fly ash or other heavy weight particles downward through the post combustor 104 into the ash collector 105. The ash collector 105 may be cone shaped or cyclone shaped. The ash collector may be designed to collect the fly ash and other particles in the center of collector 105 and flow downward, or form slag on the walls of the collector 105 and flow downward. Ash collector 105 may be connected to the second gasifier 103 through second gasifier port 601 and may have connectors 601" and 601'.

Figure 4:
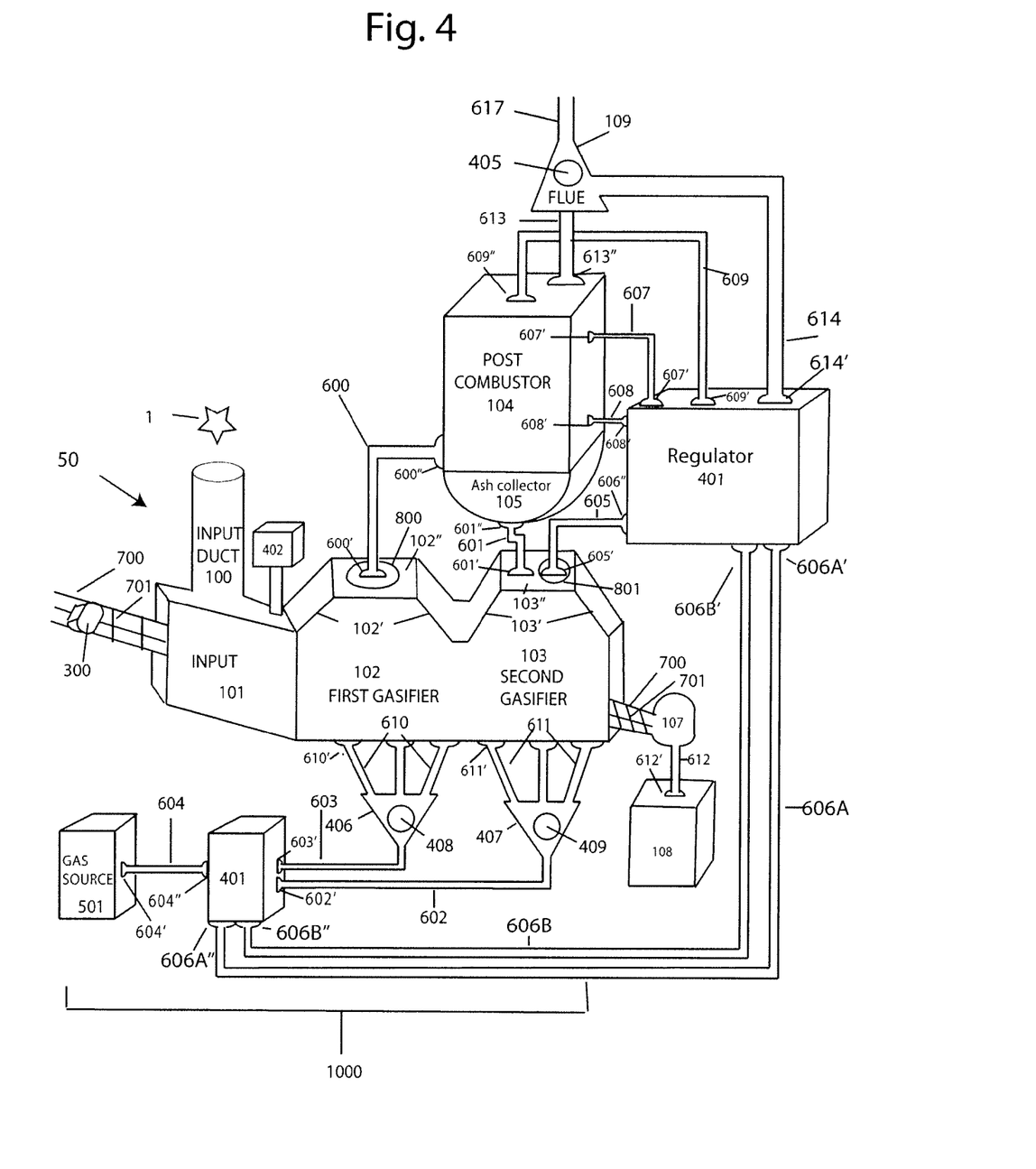
FIG. 4 is a forward view of an embodiment of the present invention having one regulator.

The post combustor 104 may also include a flue 109 that permits gas to leave the post combustor 104 through a flue escape 617. Alternatively, gas may be rerouted through the system 50 through the flue gas return regulator 403, which may send the gas to regulator 400 or gas source 501. Additionally, the flue 109 may have a valve 405 and valve controller which controls the distribution of gas flow between ports 617 and 614. The valve 405 may be controlled by a servo magnetic controller or another mechanical, hydraulic, magnetic, or electric controller which can cause the value to open or close. In some embodiments the valve 405 may be partially opened or closed. The valve may be operable to allow all of the gas exiting the post combustor 104 to escape the system, or to recirculate some of the gas to regulator 403. As shown, port 615 transfers gas to regulator 400, port 606A transfers gas from gas splitter 401 to regulator 403, and port 606B transfers gas from regulator 403 to gas splitter 401. Each port 614, 615, and 606 may have their own connectors 614', 615', 615", 606A', 606B', 606A" and 606B" as well. The regulators 400 and 403 may be able to open and close optional valves in these ports as well. Flue gas regulator 403 may be linked with controller 402 and regulator 400 as well. Gas regulator 403 may comprise a controller to control the position of the flue valve, to regulate how much gas from the flue and the gas source flows through gas port 615. As shown in FIG. 4, one regulator 401 may perform the functions of regulators 403 and 400.

Figure 2:
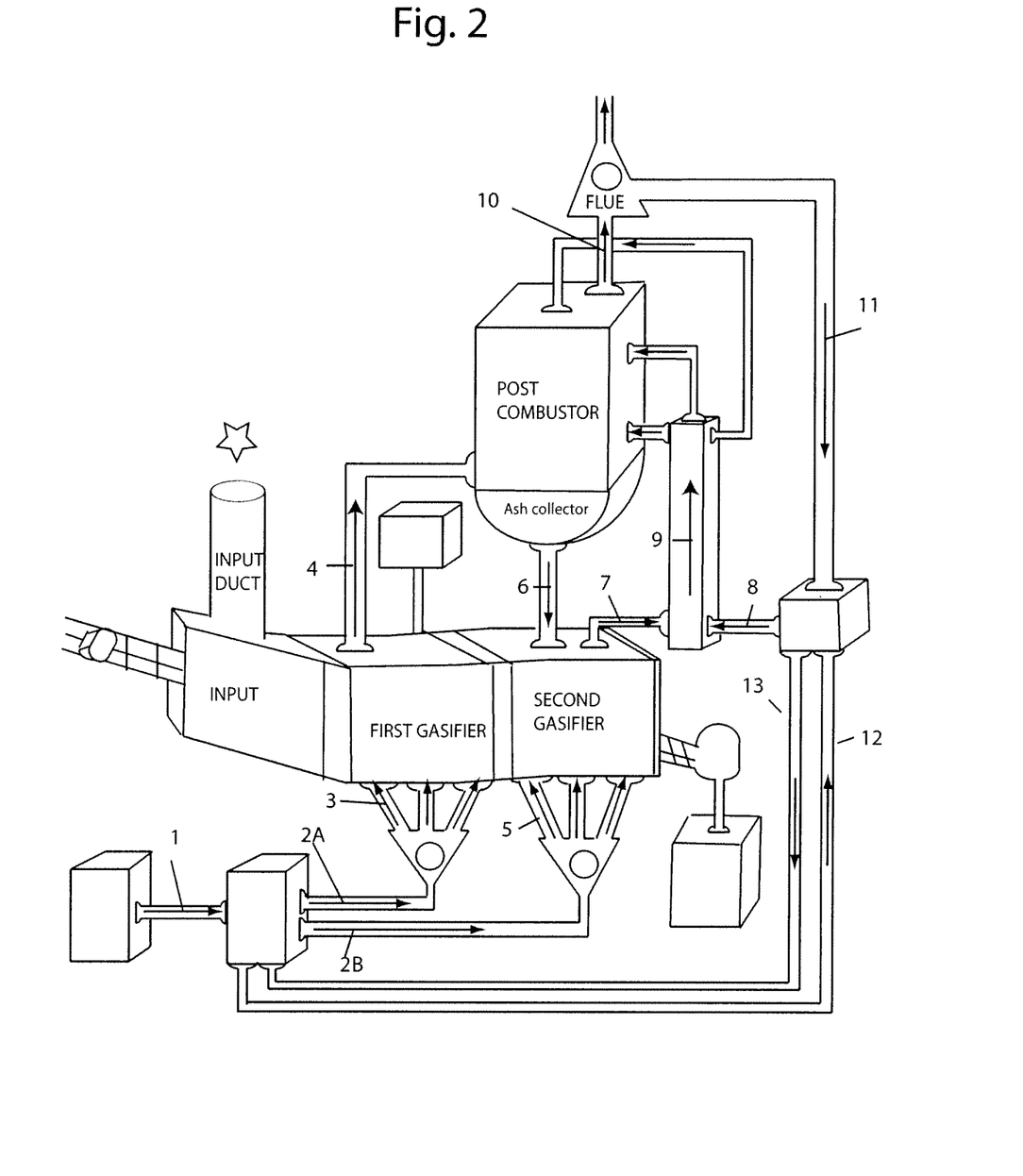
FIG. 2 is a forward view of an embodiment of the present invention illustrating the gas flow through the system.

FIG. 2 illustrates a process flow of the gas through the system 50. Although labeled sequentially, many of the following steps may be performed in a different order or may be performed simultaneously with another step. Step 1, Gas enters the system through gas source 501 where it passes through gas port 604 which is connected by connectors 604' and 604" to gas splitter 401. Step 2, gas splitter 401 can split or portion the gas to gas splitters 406 and 407. As shown in step 13, gas splitter 401 can also receive gas from regulator 403, and can send gas to regulator 403 as shown in step 12. Regulators 403 and 400 or controller 402 may be able to modify how the gas is split between the gas splitters. Step 3, valves 408 and 409 can modify how much gas goes into gas hoppers 610 and 611. Valves 408 and 409 may be controlled by the gas splitters or by any of the regulators or controllers. Step 4, once inside the first gasifier 102, the gas mixes with the gas in the first gasifier. Additionally the gas gasifies the refuse, thereby producing a gas which flows through gasification port 600. Step 5, gases from gas hoppers 611 flow into the second gasifier where they gasify and combust the refuse in the second combustor 103. The resulting gases flow up through the second gasifier port 605. Step 6, ash from ash collector 105 may flow through port 601 into the second gasifier 103. Step 7, gas in the second gasifier gas port 605 may be mixed with new gas from the gas source of regulator 400. Regulator 400 may contain its own gas or have access to gas external to the system 50. Step 8, gas source may also receive recirculated flue gas from port 615. Step 9, gas source may send gas through gas port 606 where it enters regulator 403. Regulator 400 can select how much gas to send to the top or side gas ports 607, 608, and 609. The top 609 and side gas ports 607, 608 send gas to the post combustor 104. Step 10, gas is released up through flue port 613 into the flue 109, and heavier weight particles settle in ash collector 105. The flue may be controlled through a valve 405 which can also be controlled by any of the regulators or controllers. The valve 405 either allows the flue gas to escape through the flue gas escape 617 and/or it may direct flue gas through the flue gas return port 614, step 11. Flue gas return regulator 403 can send gas to either of the regulator 400 or gas source 501 through gas ports 615 (step 8) or 606B (step 13).

It is hereby claimed:

1. A two stage refuse gasification combustion system for processing refuse, said system comprising: an advancer, a first and second gasifier, a first gas regulator, and a post combustor:
    a. said advancer extending from the first gasifier to the second gasifier for moving the refuse from the first gasifier to the second gasifier;
    b. said post combustor comprising a connection to the first and second gasifier; and
    c. said first gas regulator comprising:
    an input port for receiving gas; an output port for outputting gas; valves for regulating gas flow in the system; control software to allow the regulator to control opening and closing of the valves which regulate how much gas flows into the input port and how much gas flows out of the output port;
    d. a central controller containing software for causing the controller to perform the steps of controlling a speed of the advancer; controlling a flow rate of gas through a first and second gas splitter; and controlling a positioning of the valves in the first gas regulator.

2. A two stage refuse gasification combustion system for processing refuse, said system comprising: an advancer, a first and second gasifier, a first gas regulator, and a post combustor:
    a. said advancer extending from the first gasifier to the second gasifier for moving the refuse from the first gasifier to the second gasifier;
    b. said post combustor comprising a connection to the first and second gasifier; and
    c. said first gas regulator comprising:
    an input port for receiving gas; an output port for outputting gas; valves for regulating gas flow in the system; control software to allow the regulator to control opening and closing of the valves which regulate how much gas flows into the input port and how much gas flows out of the output port;
    d. a controller containing software stored on a computer readable medium and a microprocessor for executing the software, said software containing an instruction set for causing the controller to
        i. regulate and control the amount of oxygen in the first gasifier, the second gasifier, and the post combustor, thereby controlling temperature and speed of combustion of the refuse and gases, allowing the system to reduce production of nitrous oxide; and
        ii. instruct a first gas splitter to send gas having a low oxygen content to the first gasifier through a second gas splitter.

3. The software of claim 2 wherein the instruction causes the controller to instruct a first gas splitter to send the gas, and the gas contains 5-20% $O_2$ by volume.

4. The software of claim 2 comprising an instruction for causing the first gas regulator to send recirculated flue gas through a first port connected to a second regulator.

5. The software of claim 4 wherein the instruction causes the controller to instruct the first gas regulator to send recirculated flue gas.

6. The software of claim 4 comprising an instruction for causing the second regulator to partially open a valve in a flue causing the recirculated flue gas to enter a second port connected to the second regulator.

7. The software of claim 6 wherein the instruction causes the controller to instruct the first gas regulator to partially open the valve.

8. The software of claim 6 comprising an instruction for opening a value to allow flue gas to flow from the second port, through the second regulator, into the first port which feeds into the first gas splitter.

9. The software of claim 8 wherein the instruction causes the controller to instruct the second regulator to open the valve to allow flue gas to flow from the second port.

10. The software of claim 2 comprising an instruction for instructing a first gas splitter to send oxygen rich gas to the second gasifier through a second gas splitter.

11. The software of claim 10 wherein the instruction causes the controller to instruct the first gas splitter to send oxygen rich gas, and the gas contains 20-100% $O_2$ by volume.

12. The software of claim 10 comprising an instruction for instructing a gas source to direct gas into the first gas splitter.

13. The software of claim 10 comprising an instruction for instructing the first gas splitter to open a valve allowing gas from a gas source to enter the first gas splitter.

14. The software of claim 10 comprising an instruction for instructing the controller or the first regulator to shut a valve connected to a port to prevent flow of recirculated gas from the first regulator.

15. The software of claim 10 comprising an instruction for instructing the controller or the first regulator to shut a valve in a flue.

16. The software of claim 2 comprising an instruction for instructing the controller or the first regulator to monitor gas temperature or oxygen content in the post combustor and, if gas temperature or oxygen content of gases in the post combustor becomes higher than a predetermined value, an instruction for instructing the first regulator to send recirculated gas to the post combustor.

17. The software of claim 16 wherein the predetermined value is 1000° C. or 10% $O_2$ by volume.

18. The software of claim 2 comprising an instruction for instructing the controller or the first regulator to monitor gas temperature or oxygen content in the post combustor software and, if gas temperature or oxygen content in the post combustor becomes lower than a predetermined value, an instruction to request oxygen rich gas from a gas source to be routed through a port through the first gas regulator and a second regulator into the post combustor.

19. The software of claim 2 comprising an instruction for instructing the controller or the first regulator to monitor gas temperature or oxygen content in the post combustor and, if gas temperature or oxygen content in the post combustor becomes lower than a predetermined value, an instruction to instruct the first gas regulator or a second regulator to open a valve to a gas source connected directly to the first gas regulator.

20. The software of claim 2 comprising an instruction for instructing an adjuster to modify an angle at which a port directs gas into the post combustor.

21. A two stage refuse gasification combustion system for processing refuse, said system comprising: an advancer, a first and second gasifier, a first gas regulator, and a post combustor:
　a. said advancer extending from the first gasifier to the second gasifier for moving the refuse from the first gasifier to the second gasifier;
　b. said post combustor comprising a connection to the first and second gasifier; and
　c. said first gas regulator comprising a plurality of input and output ports including:
　　i. a first input port for receiving gas from the second gasifier;
　　ii. a second input port for receiving gas from a second gas regulator;
　　iii. a first output port connected to a lower portion of a sidewall of the post combustor for directing gas horizontally into the post combustor;
　　iv. a second output port connected to an upper portion the sidewall of the post combustor for directing gas horizontally into the post combustor; and
　　v. a third output port connected to a top portion of the post combustor for directing gas downwardly into the post combustor;
　d. and wherein the system comprises valves for regulating gas flow in the system; and control software to allow the regulator to control opening and closing of the valves which regulate how much gas flows into the input ports and how much gas flows out of the output ports.

22. The system of claim 21 wherein the first gas regulator comprises an adjuster for manipulating an angle at which the three output ports direct gas into the post combustor.

23. A two stage refuse gasification combustion system for processing refuse, said system comprising: an advancer, a first and second gasifier, a first gas regulator, and a post combustor:
　a. said advancer extending from the first gasifier to the second gasifier for moving the refuse from the first gasifier to the second gasifier;
　b. said post combustor comprising a connection to the first and second gasifier; and
　c. said first gas regulator comprising:
　an input port for receiving gas; an output port for outputting gas; valves for regulating gas flow in the system; and control software to allow the regulator to control opening and closing of the valves which regulate how much gas flows into the input port and how much gas flows out of the output port;
　d. a first gas hopper fluidly connected to a first gas splitter and the first gasifier, said first gas splitter connectable to a gas source for receiving gas external from the system; said first gasifier comprising a sloped top for directing gas into the post combustor;
　e. a flue connected to the post combustor, said flue comprising a valve operable to allow gas to escape the system when the valve is in a first position or cause at least some of the gas to recirculate when in a second position;
　f. a second gas regulator for directing gas through the system, said second gas regulator comprising:
　a connection with the flue to receive recirculated gas from the flue;
　a controller to control the position of the flue valve;
　a connection to the gas source to allow the second gas regulator to receive gas external from the system;
　a gas output connected to the first gas regulator to direct gas into the first gas regulator; and
　a valve and valve controller to control how much gas from the flue and the gas source flows through the gas output.

24. The system of claim 23 wherein the system comprises a second gas hopper fluidly connected to a second gas splitter and the second gasifier, said second gas splitter connectable to a gas source for receiving gas external from the system; said second gasifier comprising a sloped top for directing gas into the post combustor.

* * * * *